United States Patent [19]
Spies et al.

[11] Patent Number: 5,956,659
[45] Date of Patent: Sep. 21, 1999

[54] ARRANGEMENT AND METHOD FOR THE AUTOMATIC CORRECTION OF ERROR-CONTAINING SCANNING SIGNALS OF INCREMENTAL POSITION-MEASURING DEVICES

[75] Inventors: Alfons Spies, Seebruck; Wolfgang Holzapfel, Obing, both of Germany

[73] Assignee: Johannes Heidenhain GmbH, Traunreut, Germany

[21] Appl. No.: 09/047,702

[22] Filed: Mar. 25, 1998

[30] Foreign Application Priority Data

Mar. 26, 1997 [DE] Germany .......................... 197 12 622

[51] Int. Cl.⁶ .................................................. G06F 11/00
[52] U.S. Cl. ............................... 702/94; 702/106; 33/706
[58] Field of Search ............................... 702/94–95, 150, 702/151, 106; 364/723; 33/706, 707, 1 L

[56] References Cited

U.S. PATENT DOCUMENTS

| | | | |
|---|---|---|---|
| 4,225,931 | 9/1980 | Schwefel | 702/150 |
| 4,334,150 | 6/1982 | Herbst et al. | 250/201.8 |
| 4,462,083 | 7/1984 | Schwefel | 702/94 |
| 4,490,914 | 1/1985 | Spies | 33/700 |
| 4,595,991 | 6/1986 | Spies | 33/12 |
| 4,879,473 | 11/1989 | Zumoto et al. | 702/85 |
| 5,235,175 | 8/1993 | Mayer | 347/237 |
| 5,627,466 | 5/1997 | Spies et al. | 324/207.21 |

OTHER PUBLICATIONS

"Auto correction of interpolation errors in optical encoders," C. Wang et al. in Proc. Of SPIE vol. 2718, (1996), pp. 439–447.

"Determination and correction of quadrature fringe measurement errors in interferometers," P.L.M. Heydemann, Applied Optics, vol. 20, No. 3, (1981), pp. 3382–3384.

"Optical fringe interpolation with nanometric accuracy," K.P. Birch, Precision Engineering, vol. 12, No. 4, (1990), pp. 195–198.

*Primary Examiner*—John Barlow
*Assistant Examiner*—Bryan Bui
*Attorney, Agent, or Firm*—Brinks Hofer Gilson & Lione

[57] ABSTRACT

An arrangement as well as a method for the automatic correction of error-containing scanning signals, which contain defined deviations from the ideal signal shape, of incremental position measuring devices is disclosed, wherein an ideal signal shape is presupposed by a downstream arranged evaluation unit. In this case the scanning signals are supplied to a processor unit, and correcting values are determined by means of a correction algorithm which are converted in turn into appropriate control signals. The analog scanning signals as well as the control signals are supplied to a correction unit, which contains several adjustment possibilities for correcting the error-containing scanning signals by the control signals acting on them. The processor unit as well as the correction unit are arranged in such a way that scanning signals, which have already passed through the correction unit, are present at the input side of the processor unit.

21 Claims, 1 Drawing Sheet

ARRANGEMENT AND METHOD FOR THE AUTOMATIC CORRECTION OF ERROR-CONTAINING SCANNING SIGNALS OF INCREMENTAL POSITION-MEASURING DEVICES

FIELD OF THE INVENTION

The present invention relates to an arrangement and method for the automatic correction of error-containing scanning signals of incremental position-measuring devices wherein at least a pair of phase-shifted analog scanning signals which deviate from an ideal signal shape are input to an evaluation unit, and wherein an ideal signal shape is presupposed by an evaluation unit located downstream.

BACKGROUND OF THE INVENTION

In connection with known incremental position measuring devices, usually at least two phase-shifted periodic analog scanning signals are output in the course of scanning a periodic graduation structure by a suitably designed scanning unit. These signals are further processed in a known manner in an evaluation unit located downstream of the scanning unit for determining the relative position of the periodic graduation structure and the scanning unit. The scanning unit and the periodic graduation structure may be connected with two elements of a machine tool respectively which can be moved with respect to each other, for example. A numerical control may be used as the evaluation device.

The accuracy of position determination by such a position measuring device depends on the quality of the periodic scanning signals generated. Depending on the physical scanning principle employed, a number of errors of different types may exist. For example, in an optical measuring system, inaccuracies in reflective and transmissive graduation structures have a negative effect on signal quality. In other scanning principles, for example in magnetic position measuring devices, the scanning signals output do riot always meet the desired requirements. For example, scanning distance may vary or temperature variations can affect the magnetically sensitive detector elements, etc.

Certain types of error have an interfering effect particularly during subsequent interpolation by an evaluation unit, i.e., the further electronic division of the analog scanning signals. However, evaluation units are typically programmed to presume that the analog scanning signals have an ideal shape, or that an ideal relationship exists between the signals. The various types of errors include different amplitude values of the two phase-shifted scanning signals, a phase shift which differs from the presupposed phase shift, or possibly present d.c. voltage offsets of the two periodic scanning signals. In the case of conventional measuring systems, the mentioned phase shift is 90°, however, in connection with interferential three-grating measuring systems, there can be an ideal phase shift of 120° between three different scanning systems.

Besides the option of optimizing actual signal gains, there have been other attempts to automatically and electronically correct such errors in position measuring devices which generate periodic analog scanning signals. For example, an electronic correction for optical position measuring devices is disclosed in Wang, C. et al., "Auto-Correction of Interpolation Errors in Optical Encoders" *Proc. of SPIE*, vol. 2718, 1996, pp. 439 to 447. The Wang et al. article proposes transmitting the analog scanning signals by a suitable A/D converter to a micro-controller in which correction parameters are determined on the basis of a known algorithm. Such a known correction algorithm is described, for example, in Heydemann, P. L. M., "Determination and Correction of Quadrature Fringe Measurement Errors in Interferometers" in *Applied Optics*, vol. 20, no. 3, 1981, pp. 3382 to 3384; and by Birch, K. P., "Optical Fringe Interpolation with Nanometric Accuracy" *Precision Engineering*, vol. 12, no. 4, 1990, pp. 195 to 198. With D/A converters downstream of the microcontroller, the correction parameters reach an analog switching circuit through which the analog periodic scanning systems can be affected. Therefore the corrected scanning signals which correspond to the presumed ideal signal shape are present on an output side of the analog switching circuit and can be further processed in known electronic evaluation devices.

Such a correction method has disadvantages because, as a rule, the analog switching circuit through which the analog scanning signals are affected, also contains certain errors. Among these are, for example, undesired offset errors, or an undefined signal amplification. These errors, however, are not accounted for in the definition of the correction parameters, or respectively the corresponding adjustment signals, and therefore continue to falsify the analog scanning signals as before in an undesired way. It is additionally required to tune the sensitivity of the correction parameters, or respectively the corresponding adjustment signals generated by the microcontroller, to the analog switching circuit, which is problematic in case of possibly existing errors in the analog switching circuit.

It has further been shown to be disadvantageous that the selection of the data employed for the determination of correction parameters must be checked by software. Such a check of the data requires a certain amount of time for calculation, which in turn limits the speed of the proposed correction method which is particularly important for high processing speeds.

SUMMARY OF THE INVENTION

It is an object of the present invention to further develop the known arrangement and method of the above mentioned publications as advantageously as possible in order to assure a further improved correction of error-containing analog scanning signals generated by an incremental position measuring device, i.e., to eliminate the errors occurring in the course of scanning, or at least to minimize them.

In accordance with the present invention, a signal correction arrangement is proposed where the analog scanning signals present on an output side of a correction unit, which possibly had already been corrected once, are supplied to a processor unit which, on the basis of the scanning signals supplied, again applies a correction algorithm to the scanning signals, determines appropriate correction values, or analog adjustment signals, and enters these in turn in the correction unit, where the analog scanning signals can be influenced.

Since scanning signals which already have passed through the correction unit once, or have already been corrected once, are used as the basis for the correction algorithm, a further improved signal correction is the result. In particular, the above mentioned problems regarding possible errors in the analog correction unit can be minimized. Such errors are taken into consideration in the determination of the required correction parameters and are compensated by the output of appropriate adjusting signals.

In addition, in an advantageous embodiment of the present invention, a relatively simple structure with only one A/D converter is required on the input side of the processor unit.

The method and amendment according to the present invention are furthermore extremely flexible with respect to the selection of those signal values which are employed for determining the correction parameters. In particular, no elaborate steps requiring extensive calculating times are needed. In this way it is possible by the method and arrangement according to the present invention, to make the desired corrections in a dependable manner even at high relative speeds of the scale graduation and the scanning unit.

For example, the steps according to the present invention can all be performed within the position measuring device. However, it is also possible in the same way to realize the respective steps at another place, i.e., outside of the actual position measuring device. In both cases appropriately corrected scanning signals are transmitted to a downstream arranged evaluation unit and further processed for position determination.

Further advantages as well as details of the arrangement and method according to the present invention, ensue from the following description of preferred embodiments.

DETAILED DESCRIPTION OF THE PRESENTLY PREFERRED EMBODIMENTS

Figure 1:
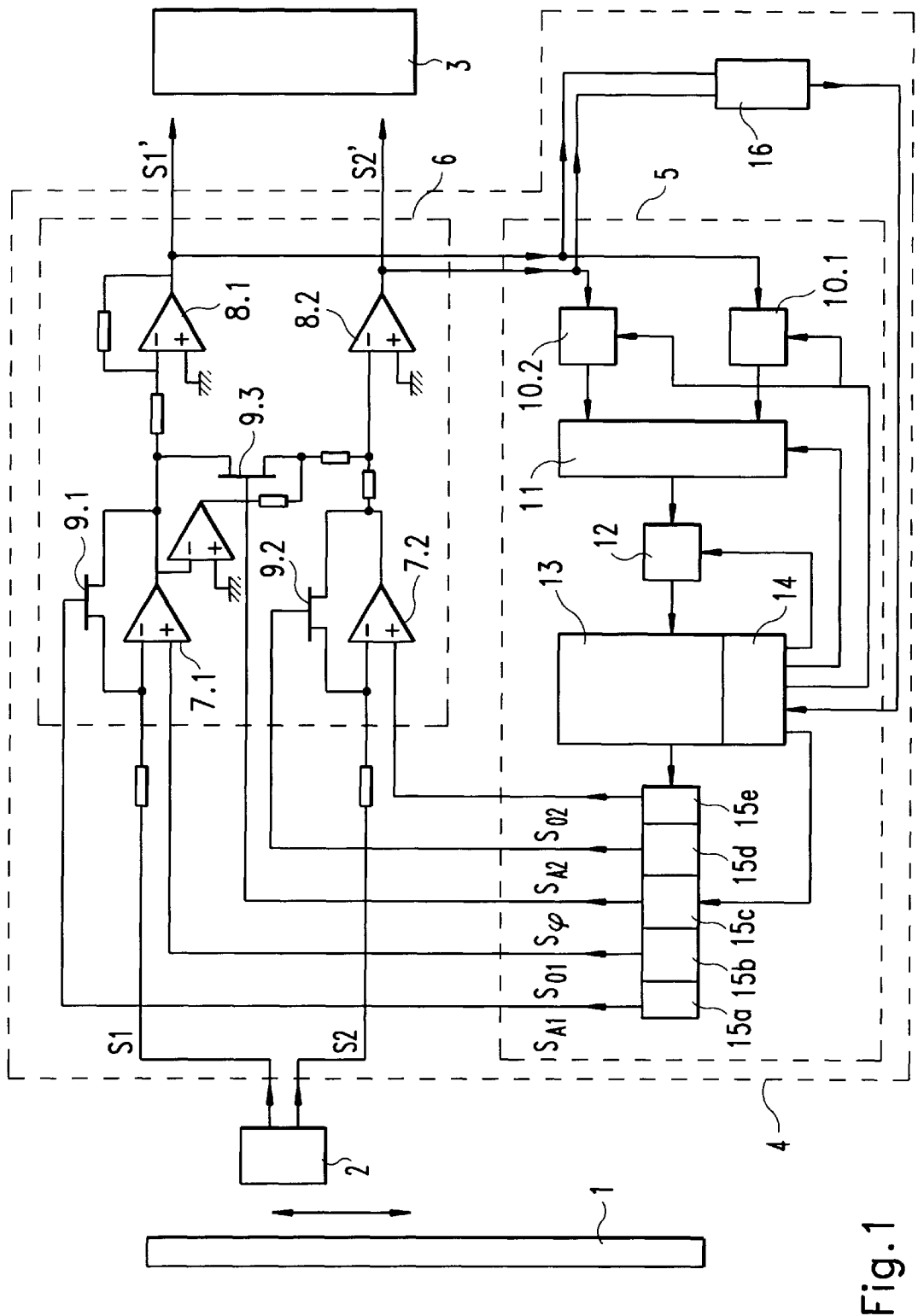
FIG. 1 is a schematic block diagram of a position measuring device according to a preferred embodiment of the present invention.

FIG. 1 is a schematic block diagram of a position measuring device according to a preferred embodiment of the present invention. Included are a scale graduation 1, a scanning unit 2, an arrangement 4 for the automatic correction of scanning errors and an evaluation unit 3. In a preferred embodiment the arrangement 4 includes a processor unit 5, an analog correction unit 6 and an interpolation unit 16. The processor unit 5 includes preferably two sample and hold circuits 10.1, 10.2; a multiplexer 11, analog-to-digital converter 12, central processing unit 13, memory 14 and a plurality of digital-to-analog converters 15a–e. The analog correction unit 6 includes a plurality of operational amplifiers 7.1, 7.2, 7.3, 8.1, 8.2, and adjustment elements 9.1, 9.2, 9.3. An arrow indicates that the scale graduation 1 and the scanning unit 2 are displaceable with respect to each other. The scale graduation 1 and the scanning unit 2 may be embodied in any well known manner. For example, an optical scale graduation or a magnetic scale graduation may be used, which are scanned by an appropriately designed scanning unit for generating displacement- dependent scanning signals. In addition, other physical scanning principles can of course be employed for signal generation, for example, inductive scanning principles operated in connection with a carrier frequency evaluation method as is well known to those of ordinary skill in the art.

With respect to optical position measuring devices, the steps according to the present invention for example also make possible the use of so-called biased photoelements or photodiodes which have rapid response times but, based on their temperature dependency, can provide error-containing scanning signals. With respect to magnetic position measuring devices it is also possible to correct those errors caused by the use of magnetic field-dependent resistors, magneto-resistive elements or Hall elements forming the magnetically sensitive detector elements.

In addition, while a longitudinal measuring system is shown, this is by way of example only, and the present invention may be used with angular or rotary measuring systems.

Periodic analog scanning signals S1, S2 are present at the output side of the scanning unit 2 and are employed by a downstream evaluation unit 3 for position determination in a well known manner, and to this end are interpolated, for example. The schematically indicated evaluation unit 3 can, for example, be a numerical control of a machine tool. The evaluation unit 3 is programmed to presume a defined ideal signal shape of the two scanning signals S1, S2, as well as corresponding relationships between the signals. Among these presumptions is an ideal phase shift of 90° between the two periodic scanning signals S1 and S2, as similar as possible, signal amplitudes of the scanning signals S1, S2, as well as vanishing d.c. voltage portions, or respectively offsets, of the signals S1 and S2. In order to satisfy these requirements of the evaluation unit 3, defined steps are provided by the present invention so that an automatic correction of the usually error-containing scanning signals S1, S2 takes place during the measuring operation, and scanning signals S1', S2', optimized in this way, can be transmitted to the evaluation unit 3.

The periodic scanning signals S1, S2 provided by the scanning unit 2 first reach the correction unit 6 within the arrangement 4 for automatic correction of various scanning errors. A series of adjustment possibilities for the error-containing signals S1, S2 are provided by the correction unit 6 and will be explained hereinafter.

In the correction unit 6 adjustment elements 9.1, 9.2, 9.3 are provided which influence the analog scanning signals S1, S2 in a defined manner. In this case the analog adjustment elements 9.1, 9.2, 9.3 are embodied as electronically adjustable potentiometers, for example, whose resistances can be varied within appropriate limits. More preferably, two adjustment elements 9.1, 9.2 are provided inside the correction unit 6 for correction of the various scanning errors and are respectively switched between the negative input terminal of operational amplifiers 7.1, 7.2. These adjustment elements 9.1, 9.2 provide a definitive variation in the signal amplitudes of the two scanning signals S1, S2. As already described above, the evaluation unit 3 presumes that the amplitudes of the two analog scanning signals S1, S2, are as equal as possible.

A further adjustment element 9.3 is coupled between the two processing channels of the scanning signals S1, S2 and permits a definite variation of the phase position of the two scanning signals S1, S2 which, in the ideal case, are offset by 90° with respect to each other.

In order to properly adjust the values of the adjustment elements 9.1, 9.2, 9.3, these adjustment elements are acted upon by control signals $S_{A1}$, $S_{A2}$, $S_\phi$. Further adjustment possibilities for the analog scanning signals S1, S2 exist by applying control signals $S_{O1}$, $S_{O2}$ at the positive terminal of the operational amplifiers 7.1, 7.2. Control signals $S_{O1}$, $S_{O2}$ adjust the respective d.c. voltage portion, or respectively offset, of the two scanning signals S1, S2. Reference is made to the following description in relation to the generation of the various control signals $S_{A1}$, $S_{A2}$, $S_{O1}$, $S_{O2}$, $S_\phi$. The preferred embodiment of the analog correction unit 6 shown in FIG. 1 should of course be understood as an example and that the present invention is not so limited.

During the measuring operation, the incoming analog scanning signals S1, S2 are continuously acted upon by defined control signals $S_{A1}$, $S_{A2}$, $S_{O1}$, $S_{O2}$, $S_\phi$ in the correction unit 6. It is possible in this way to transmit as ideal as possible corrected scanning signals S1', S2' to the downstream evaluation unit 3. The generation of the different control signals $S_{A1}$, $S_{A2}$, $S_{O1}$, $S_{O2}$, $S_\phi$ for the various adjustment possibilities takes place in the processor unit 5 to which those scanning signals S1', S2' are supplied by the output side of the correction unit 6. The determination of the correction values or parameters, and the generation of corresponding control signals $S_{A1}$, $S_{A2}$, $S_{O1}$, $S_{O2}$, $S_\phi$ for the analog scanning signals S1, S2 takes place in the processor unit 5 on the basis of the signals S1', S2' present on the input side of the processor unit 5. Therefore, the control signals $S_{A1}$, $S_{A2}$, $S_{O1}$, $S_{O2}$, $S_\phi$ are present on the output side of the processor unit 5, by which possibly required different signal adjustments are performed within the correction unit 6 in order to continuously assure as ideal as possible desired ideal signal shape of the analog scanning signals S1', S2'.

In the preferred embodiment shown the processor unit 5 has the two sample/hold stages 10.1, 10.2, arranged on its input side, for the pair of periodic scanning signals S1', S2', i.e., one respective stage 10.1, 10.2 per scanning signal. A multiplex unit 11 downstream of the two sample/hold stages 10.1, 10.2, time-sequentially switches the present analog scanning signals S1', S2' through to an A/D converter unit 12. Digitizing of the analog scanning signals S1', S2' takes place in the A/D converter unit 12, i.e., the further processing of the scanning signals S1', S2' takes place in digital form in the processor unit 5. The digitized scanning signals are supplied to a central processing unit (CPU) 13, which is preferably embodied in the form of a microprocessor and to which furthermore a working memory 14 is assigned.

Alternatively it is also possible in principle to replace the represented multiplexer unit 11 and A/D converter unit 12 by several parallelly arranged A/D converter units.

The determination of possibly required correction signals for the scanning signals S1, S2 takes place in the CPU 13 by the implementation of an appropriate correction algorithm. To accomplish this, preferably several associated pairs of signal values from the two scanning signals present are stored, and the corresponding correction values, or respectively the analog control signals $S_{A1}$, $S_{A2}$, $S_{O1}$, $S_{O2}$, $S_\phi$ are formed on the basis of several of such pairs of values.

Regarding an advantageous possibility for determining the correction values for phase-shifted, error-containing scanning signals of a position measuring device, special mention is made of the publications of C. Wang et al., P. L. M. Heydemann and K. P. Birch, already mentioned above.

Correction values, as well as corresponding control signals, which at this point are still present in digital form, for the various adjustment possibilities in the correction unit 6, are determined by the CPU 13 on the basis of the correction algorithm. Besides the determination of correction values, the central CPU 13 furthermore takes over the complete sequential control and synchronization within the processor unit 6, which is meant to be indicated by the corresponding connections between the CPU 13 and the associated memory unit 14, on the one hand, and on the other hand, the various components 10.1, 10.2, 11, 12, 15*a–e* of the processor unit 5.

The defined control signals, still present in digitized form, are converted by the digital-to-analog converter units 15*a–b*, disposed on the output side of the processor unit 5, into analog output signals $S_{A1}$, $S_{A2}$, $S_{O1}$, $S_{O2}$, $S_\phi$ which are transmitted to the correction unit 6. Alternatively it is also possible to employ only one D/A converter unit instead of the plurality of D/A converters 15*a–b*. Automated correction of the periodic scanning signals S1, S2 during the measuring operation is made possible by the application and effect of the control signals $S_{A1}$, $S_{A2}$, $S_{O1}$, $S_{O2}$, $S_\phi$ on the various adjustment possibilities of the correction unit 6. The corrected scanning signals S1', S2' are transmitted to the evaluation unit 3.

In the course of the application of the control signals $S_{A1}$, $S_{A2}$, $S_{O1}$, $S_{O2}$, $S_\phi$ on the analog scanning signals S1, S2 it is additionally assured that the correction parameters, or the control signals $S_{A1}$, $S_{A2}$, $S_{O1}$, $S_{O2}$, $S_\phi$ do not change too abruptly from one correction cycle to the next. Instead, a certain amount of continuity of the control signals $S_{A1}$, $S_{A2}$, $S_{O1}$, $S_{O2}$, $S_\phi$ is assured over several correction cycles in order to avoid abrupt changes in the emitted corrected scanning signals S1', S2'. Several possibilities exist for assuring such continuity of the control signals $S_{A1}$, $S_{A2}$, $S_{O1}$, $S_{O2}$, $S_\phi$ transmitted from the processor unit 5 to the correction unit 6. For example, a maximum allowable change of the control signals $S_{A1}$, $S_{A2}$, $S_{O1}$, $S_{O2}$, $S_\phi$ from one correction cycle to the next can be preset. In addition, it is possible for the described control to be embodied as a Pi control, so that the continuity of the control signals $S_{A1}$, $S_{A2}$, $S_{O1}$, $S_{O2}$, $S_\phi$ is assured by the integral portion of the control.

In contrast to the known prior art systems, the error-containing analog scanning signals S1, S2 are only transmitted to the processor unit 5 after having passed through the correction unit 6. In a subsequent correction cycle, the subsequent periodic scanning signals can already be acted upon by the defined correction or adjustment values, and in this way can be at least roughly corrected. The scanning signals S1, S2, which have been roughly corrected for the first time in this manner, are subsequently again used as input values for the processor unit 5 which can perform a renewed determination of possibly required control signals $S_{A1}$, $S_{A2}$, $S_{O1}$, $S_{O2}$, $S_\phi$ on this basis by which the following analog scanning signals S1, S2 are acted upon. In this way a further improved signal correction of the scanning signals S1, S2 results which can be further processed by the downstream arranged evaluation unit 3. Furthermore, in the determination of the various correction values, or respectively control signals $S_{A1}$, $S_{A2}$, $S_{O1}$, $S_{O2}$, $S_\phi$, those errors, which were caused by the analog correction unit 6 are also considered.

Only defined pairs of signal values are extracted from the analog scanning signals S1, S2 for performing the correction algorithm and the determination of the required correction values, or respectively control signals. The correction algorithm is then performed on the basis of the selected pairs of signal values. In this connection, a series of options exists within the arrangement and method according to the present invention regarding the selection of the signal values used.

For example, in a first preferred embodiment it is also possible to provide the analog scanning signals S1, S2 in uncorrected or already corrected form to an interpolation unit 16, which divides the signal period into a preset number of counting steps. In FIG. 1 this variant with respect to the selection of the pairs of signal values is represented wherein the signals provided to the interpolation unit 16 are picked up at a location at which scanning signals S1', S2', already corrected after the first correction cycle, are present. Then only the signal values of the corrected scanning signals S1', S2' are transmitted to the CPU 13 in the processor unit 5 via the sample/hold stages 10.1, 10.2, the multiplexer unit 11 and the A/D converter unit 12, at those positions which correspond to the appropriate interpolation counting steps. To this end the scanning signals S1', S2' are present on an input side of the interpolation unit 16, and the output side the interpolation unit 16 provides a corresponding synchronization signal for the CPU 13, which subsequently causes the read-in of the signal values at these appropriate interpolation counting steps. For the purpose of reading-in, or respectively detecting the signals, at least corresponding signals are transmitted from the CPU to the A/D converter unit 12.

Alternatively it can also be provided that at the desired positions where signal values are to be taken over, corresponding synchronization signals are transmitted by the interpolation unit 16 to the sample/hold stages 10.1, 10.2, the multiplexer unit 11 and the A/D converter unit 12 in order to initiate the read-in process into the CPU 13.

There are a number of options regarding the embodiment of the interpolation unit 16. In principle, a further division of the signal period takes place in the interpolation unit 16 and thereby the determination of defined positions at which signal values are intended to be transmitted to the CPU for the correction algorithm. For example, a ten-fold even division of the signal period can be performed so that a transmission of synchronization signals for reading in the corresponding pairs of signal values to the CPU 13 takes place at a total of ten interpolation positions. The signal values detected, or respectively digitized, at the corresponding ten positions are then provided as signal values to the CPU 13.

To this end, in connection with a first preferred embodiment of the interpolation unit 16, the transfer positions can be transmitted to the CPU 13 in absolute-coded form. Therefore the synchronization signals consist of the absolute position information at the transfer positions. In this case it has been shown to be advantageous that, because of the known absolute transfer position, the evenness of the distribution of the signal values transferred over the signal period is immediately known to the CPU 13. Accordingly, no elaborate calculation-time-consuming checking of the signal values is required to determine whether these are available in a sufficiently distributed form and are suitable for the correction algorithm.

In a further preferred embodiment, the interpolation unit 16 can perform an incremental division of the signal period and the respective absolute transfer position can be determined by a counter running along with it, and transferred to the CPU 13.

In addition, in a third preferred embodiment it is possible for the interpolation unit 16 to perform only an incremental division of the signal period and to transmit appropriate signals for transferring the signals at several equidistantly distributed positions to the CPU.

The transmission of the absolute transfer position from the interpolation unit 16 to the CPU 13 in accordance with the first two preferred embodiments has been shown to be advantageous in particular in case of detected higher displacement speeds. It is possible to assure in this way that the pairs of signal values are transferred in every case at different positions of the associated Lissajous figure, and that the signal values are not transferred always to the same position in the Lissajous figure during several successive signal periods.

Besides this, it is possible in further preferred embodiments to perform the selection of pairs of signal values in that synchronization signals, or respectively triggering pulses, for the sample/hold stages 10.1, 10.2, the multiplex unit 11 and the A/D converter unit 12 are generated, or respectively preset, by means of software by the CPU 13. Again, not all analog scanning signals are digitized here, only a defined selection of pairs of signal values at defined positions.

On the one hand it is possible here to preset a distribution of triggering pulses which is chronologically equidistant. To assure that the pairs of signal values employed for the correction algorithm are evenly distributed over the Lissajous figure, pairs of signal values, or respectively points in time for detecting the pairs of signal values, which are suitably located for this purpose, are preset by means of software.

However, in case of possibly high displacement speeds the case can again occur that over the course of several signal periods always the same pair of signal values are detected, which lie at similar positions on the Lissajous figure so that therefore the different pairs of signal values are not particularly well suited as input data for the correction algorithm. It has therefore been shown to be advantageous if the instantaneous displacement speed is determined, for example by the measured values detected up to that time. In the case of high displacement speeds, the distribution over time of the triggering pulses is suitably changed in order to preclude this situation and to assure as even as possible a distribution of the pairs of signal values for the correction algorithm over the Lissajous figure.

But the last mentioned step need not be taken if an extremely exact signal correction is not desired at high displacement speeds and in this case it is possible on the part of the evaluation unit to make do with less accurately corrected scanning signals.

On the other hand, it is also possible to preset the triggering pulses for the selection of the pairs of signal values so that they are basically not equidistant in time and instead to preset them as a non-periodic sequence. In this case the distribution over time of the triggering pulses must be selected such that an even distribution of the pairs of signal values over the Lissajous figure is assured at any possible displacement speed. For example, a suitable statistical distribution of the triggering pulses over time can be predetermined for this purpose by means of the CPU.

It can be provided in a further preferred embodiment of the arrangement and method according to the present invention, to select the pairs of signal values to be employed for the correction always as a function of the relative speed between the scale graduation and the scanning unit. To this end it is necessary in principle to detect the respective relative speed, which can be done, for example, by suitable detectors or the detection of the frequency of the scanning signals. Thus, in case of slow displacement speeds and increased demands on accuracy it is then possible, for example, to employ more signal values from the pair of scanning signals, while at higher relative speeds and correspondingly reduced demands for accuracy the signal correction based on a few signal values is sufficient. In particular in case of slow displacement speeds it is possible to extract many pairs of signal values from the scanning signals, by which it is possible in turn to perform averaging. As a whole, based on such averaging over many pairs of is signal values, an accuracy of the determined correction values results which lies above the resolution of the A/D converter unit.

An advantageous preferred embodiment of the arrangement and method according to the present invention, furthermore includes a non-volatile memory unit in which correction values can be stored. At the start of a new measurement these correction values are converted into appropriate control signals and the analog scanning signals to be corrected are acted upon by them in the correction unit. In this manner a first, at least rough signal correction is performed already with the first passage of analog scanning signals through the correction unit. The continuous signal correction of the analog scanning signals subsequently takes place on the basis of the control as described above.

Thus, besides the described preferred embodiments, there exist a number of further possibilities for designing the arrangement and method in accordance with the invention suitably as a function of the respective requirements.

It is to be understood that the forms of the invention described herewith are to be taken as preferred examples and that various changes in the shape, size and arrangement of parts may be resorted to, without departing from the spirit of the invention or scope of the claims.

We claim:

1. An arrangement for the automatic correction of error containing scanning signals of incremental position-measuring devices wherein at least a pair of error-containing phase-shifted analog scanning signals which contain defined deviations from an ideal signal shape, are coupled to an input side of the arrangement, and wherein an ideal signal shape is presumed by an evaluation unit coupled at an output side of the arrangement, the arrangement comprising:

an analog correction unit coupled to the position-measuring device and receiving as inputs the error-containing scanning signals, wherein the analog correction unit comprises an adjustment device for correcting the error-containing scanning signals and outputting a plurality of corrected scanning signals; and a digital processor unit coupled to the analog correction unit, the digital processor unit receiving as inputs the output of the analog correction unit, wherein the digital processor unit determines a correction value by performing a correction algorithm on the corrected scanning signals which is converted into an appropriate control signal wherein the analog correction unit adjusts the adjustment device with the control signal.

2. The arrangement according to claim 1, wherein at least one A/D converter unit is arranged on the input side of the digital processor unit which digitizes the plurality of corrected scanning signals output by the analog correction unit.

3. The arrangement according to with claim 2, wherein at least two sample/hold stages are arranged upstream of the at least one A/D converter unit, and that one of the plurality of corrected scanning signals is supplied to one of the sample/hold stages.

4. The arrangement according to claim 3, wherein a multiplex unit is arranged between the at least one A/D converter unit and the at least two sample/hold stages, which causes the plurality of corrected scanning signals to be switched through in a time-sequential manner from the sample/hold stages to the A/D converter unit.

5. The arrangement according to claim 2, wherein the digital processor unit comprises at least one central processing unit in the form of a micro-processor with a working memory, to which the plurality of corrected scanning signals digitized by the A/D converter unit are supplied.

6. The arrangement according to claim 1, where at least one D/A converter unit is arranged on the output side of the digital processor unit through which the control signal is transmitted in analog formal to the analog correction unit.

7. The arrangement according to claim 1, wherein the analog correction unit comprises adjustment devices for the amplitudes of the analog scanning signals, for the d.c. voltage portions of the analog scanning signals, as well as for the mutual phase shift of the analog scanning signals, which can be acted upon by the digital processing unit through the control signal.

8. The arrangement according to claim 1, wherein the adjustment device is at least partially embodied as an electronically adjustable potentiometer.

9. The arrangement according to claim 5, wherein an interpolation unit divides the signal period of the plurality of corrected scanning signals into a predeterminable number of interpolation positions, and wherein synchronization signals for reading the associated pair of signal values into the central processing unit can be transferred at the interpolation positions.

10. The arrangement according to claim 9, wherein the interpolation unit is designed in such a way that an absolute determination or the transfer position of the pairs of signal values is possible, and the absolute position information can be transmitted to the digital processing unit as a synchronization signal.

11. A method for the automatic correction of error-containing scanning signals of incremental position measuring devices, which contain certain deviations from an ideal signal shape that is presupposed by an evaluation unit located downstream of the measuring device, the method comprising the steps of:

transmitting the error-containing scanning signals to a digital processor unit which determines a correction value using a correction algorithm and converts the correction value into n appropriate control signal;

transmitting the analog scanning signals as well as the control signal to an analog correction unit comprising an adjustment device for correcting the error-containing scanning signals by the control signal acting on them so as to generate corrected scanning signals, wherein the corrected scanning signals supplied to the digital processor unit are picked up at the output of the analog correction unit, and that the control signal is determined by the correction algorithm on the basis of the corrected canning signal.

12. The method according to claim 11, wherein a pair of phase-shifted corrected scanning signals are corrected with respect to the signal amplitudes, the d.c. voltage portions and their relative phase position.

13. The method according to claim 11, wherein a predetermined number of signal value per signal period of the corrected scanning signals is employed for determining the correction values.

14. The method according to claim 11, wherein corrected scanning signals are respectively supplied to a sample/hold stage, are subsequently switched in a time-sequential manner through to an A/D converter unit and are supplied by the latter to a central processing unit, with an associated working memory, by means of which the correction algorithm for determining the control signal is performed.

15. The method according to claim 11, wherein a signal value is employed in the correction algorithm for determining the correction value and the control signal, wherein said signal value is selected as a function of speed of the measuring device from the corrected scanning signals.

16. The method according to claim 11, wherein the control signal acting on the corrected scanning signals have been selected in such a way that the control signals of successive control cycles differ by not more than a predetermined amount.

17. The method according to claim 11, wherein the signal period of the corrected scanning signals is divided into a predetermined number of interpolation positions by means of an interpolation unit, and that at the respective interpolation positions the associated pairs of signal values are detected as input values for the correction algorithm.

18. A method for the automatic correction of error-containing scanning signals of incremental position measuring devices, which contain certain deviations from an ideal signal shape that is presupposed by an evaluation unit located downstream of the measuring device, the method comprising the steps of:

transmitting the error-containing scanning signals to a processor unit which determines correction values using a correction algorithm and converts the correction values into appropriate control signals;

transmitting the analog scanning signals as well as the control signals to a correction unit comprising several adjustment devices for correcting the error-containing scanning signals by the control signals acting on them so as to generate corrected scanning signals, wherein the corrected scanning signals supplied to the processor unit are picked up at the output of the correction unit, and that the control signals are determined by the correction algorithm on the basis of the corrected scanning signals.

19. An arrangement for the automatic correction of error-containing scanning signals of incremental position-measuring devices wherein at least a pair of error-containing phase-shifted analog scanning signals which contain defined deviations from an ideal signal shape, are coupled to an input side of the arrangement, and wherein an ideal signal shape is presumed by an evaluation unit coupled at an output side of the arrangement, the arrangement comprising:

a correction unit coupled to the position-measuring device and receiving as inputs the error-containing scanning signals, wherein the correction unit comprises an adjustment device that is at least partially embodied as an electronically adjustable potentiometer for correcting the error-containing scanning signals and outputting a plurality of corrected scanning signals; and a processor unit coupled to the correction unit, the processor unit receiving as inputs the output of the correction unit, wherein the processor unit determines a correction value by performing a correction algorithm on uncorrected scanning signals which is converted into an appropriate control signal wherein the correction unit adjusts the adjustment device with the control signal.

20. An arrangement for the automatic correction of error-containing scanning signals of incremental position-measuring devices wherein at least a pair of error-containing phase-shifted analog scanning signals which contain defined deviations from an ideal signal shape, are coupled to an input side of the arrangement, and wherein an ideal signal shape is presumed by an evaluation unit coupled at an output side of the arrangement, the arrangement comprising:

an analog correction unit coupled to the position-measuring device and receiving as inputs the error-containing scanning signals, wherein the analog correction unit comprises an adjustment device for correcting the error-containing scanning signals and outputting a plurality of corrected scanning signals;

an interpolation unit that divides the signal period of a plurality of uncorrected analog scanning signals into a predeterminable number of interpolation positions; and a digital processor unit coupled to the analog correction unit and the interpolation unit, the digital processor unit receiving as inputs either the output of the analog correction unit or the plurality of uncorrected analog scanning signals, wherein the digital processor unit determines a correction value by performing a correction algorithm on the uncorrected scanning signals which are converted into an appropriate control signal wherein the analog correction unit adjusts the adjustment device with the control signal.

21. A method for the automatic correction of error-containing scanning signals of incremental position measuring devices, which contain certain deviations from an ideal signal shape that is presupposed by an evaluation unit located downstream of the measuring device, the method comprising the steps of:

transmitting uncorrected error-containing scanning signals to an interpolation unit of a digital processor unit which determines a correction value using, a correction algorithm and converts the correction value into an appropriate control signal, wherein the signal period of the uncorrected error-containing scanning signals is divided into a predetermined number of interpolation positions by the interpolation unit, and that at the respective interpolation positions the associated pairs of signal values are detected as input values for the correction algorithm; and transmitting error containing analog scanning signals as well as the control signal to analog correction unit comprising an adjustment device for correcting the error-containing analog scanning signals by the control signal acting on them so as to generate corrected scanning signals, wherein the corrected scanning signals supplied to the digital processor unit are picked up at the output of the analog correction unit.

* * * * *

UNITED STATES PATENT AND TRADEMARK OFFICE
CERTIFICATE OF CORRECTION

PATENT NO. : 5,956,659
DATED : September 21, 1999
INVENTOR(S) : Alfons Spies et al.

It is certified that error appears in the above-identified patent and that said Letters Patent is hereby corrected as shown below:

In the Claims

In claim 1, lines 1-2, delete "error containing" and substitute --error-containing-- in its place.

In claim 6, line 4, delete "formal" and substitute --form-- in its place.

In claim 10, line 3, delete "or" and substitute --of-- in its place.

In claim 11, line 10, delete "n" and substitute --an-- in its place.

In claim 11, line 21, delete "canning" and substitute --scanning-- in its place.

In claim 13, line 2, delete "value" and substitute --values-- in its place.

In claim 13, line 4, delete "values" and substitute --value-- in its place.

UNITED STATES PATENT AND TRADEMARK OFFICE
CERTIFICATE OF CORRECTION

PATENT NO. : 5,956,659
DATED : September 21, 1999
INVENTOR(S) : Alfons Spies et al.   Page 2 of 2

It is certified that error appears in the above-identified patent and that said Letters Patent is hereby corrected as shown below:

<u>In the Claims (cont'd)</u>

In claim 14, line 1, after "wherein" insert --the--.

In claim 21, line 9, delete "," (comma).

In claim 21, line 19, after "to" insert --an--.

Signed and Sealed this

Twenty-ninth Day of May, 2001

Attest:

NICHOLAS P. GODICI

*Attesting Officer*   *Acting Director of the United States Patent and Trademark Office*